(12) United States Patent
Kogan et al.

(10) Patent No.: US 7,047,810 B2
(45) Date of Patent: May 23, 2006

(54) MICRO-ELECTRO-MECHANICAL PRESSURE SENSOR

(75) Inventors: Yakov Kogan, Bedford, MA (US); Daryoosh Vakhshoori, Cambridge, MA (US); Peidong Wang, Carlisle, MA (US)

(73) Assignee: Ahura Corporation, Wilmington, MA (US)

( * ) Notice: Subject to any disclaimer, the term of this patent is extended or adjusted under 35 U.S.C. 154(b) by 0 days.

(21) Appl. No.: 10/758,354

(22) Filed: Jan. 15, 2004

(65) Prior Publication Data

US 2004/0250625 A1    Dec. 16, 2004

Related U.S. Application Data

(60) Provisional application No. 60/534,089, filed on Jan. 2, 2004, provisional application No. 60/440,154, filed on Jan. 15, 2003.

(51) Int. Cl.
*G01L 11/00*   (2006.01)
(52) U.S. Cl. ...................................................... 73/702
(58) Field of Classification Search ................ 73/700, 73/702
See application file for complete search history.

(56) References Cited

U.S. PATENT DOCUMENTS

| | | | |
|---|---|---|---|
| 3,048,102 A * | 8/1962 | Lebourg | 102/310 |
| 4,342,230 A | 8/1982 | Okamura et al. | |
| 4,823,230 A * | 4/1989 | Tiemann | 361/283.1 |
| 5,034,848 A * | 7/1991 | Rowlette et al. | 361/283.3 |
| 5,528,939 A | 6/1996 | Martin et al. | |
| 5,939,635 A | 8/1999 | Martin | |
| 6,438,149 B1 | 8/2002 | Tayebati et al. | |
| 6,584,126 B1 | 6/2003 | Wang et al. | |

OTHER PUBLICATIONS

Sze, S.M., Semiconductor Sensors, 1994, pp. 176, 185-187, 197, 261, John Wiley and Sons, Inc.
Tayebati, P. et al., Widely Tunable Fabry-Perot Filter Using Ga(Al)As-AlOx Deformable Mirrors, IEEE Photonics Technology Letters, Mar. 1998, pp. 394-396, vol. 10, No. 3.
Tayebati et al., Microelectromechanical tunable filter with stable half symmetric cavity, Electronics Letters, Oct. 1, 1998, pp. 1967, vol. 34, No. 20.
Wang, P. et al., Half-symmetric cavity microelectromechanically tunable VCSEL with single spatial mode operating near 950 nm, pp. 1-4.
Vakhshoori, D. et al., 2mW CS singlemode operation of a tunable 1550 nm vertical cavity surface emitting laser with 50 nm tuning range, Electronics Letters, May 27, 1999, pp. 1-2, vol. 35, No. 11.

(Continued)

*Primary Examiner*—Edward Lefkowitz
*Assistant Examiner*—Andre Allen
(74) *Attorney, Agent, or Firm*—Pandiscio & Pandiscio

(57) ABSTRACT

A pressure sensor is disclosed for measuring fluid pressure comprising a pressure sensing structure comprising a mass target suspended on a spring mechanism, wherein the mass target and the spring mechanism together exhibit high Q mechanical resonance, wherein the mass target has an area which is presented in a plane perpendicular to the direction of the mechanical oscillation of the structure, and further wherein the mass target and the spring mechanism are in the form of a membrane, and transducer means for measuring the fluid pressure by characterizing the effects that the fluid molecules produce on the motion of the structure.

1 Claim, 5 Drawing Sheets

OTHER PUBLICATIONS

Vail, E.C. et al., High Performance and Novel Effects of Micromechanical Tunable Vertical-Cavity Lasers, IEEE Journal of Selected Topics in Quantum Electronics, Apr. 1997, pp. 691-697, vol. 3, No. 2.

Tucker, R.S. et al., Thermal Noise and Radiation Pressure in MEMS Fabry-Perot Tunable Filters and Lasers, IEEE Journal on Selected Topics on Quantum Electronics, Jan./Feb. 2002, pp. 88-97, vol. 8, No. 1.

Gabrielson, T.B., Mechanical-Thermal Noise in Micromachined Acoustic and Vibration Sensors, IEEE Transactions On Electron Devices, May 1993, pp. 903-909, vol. 40, No. 5.

* cited by examiner

MICRO-ELECTRO-MECHANICAL PRESSURE SENSOR

REFERENCE TO PENDING PRIOR PATENT APPLICATIONS

This patent application claims benefit of:

(1) pending prior U.S. Provisional Patent Application Ser. No. 60/440,154, filed Jan. 15, 2003 by Jakob Kogan et al. for MINIATURE RF/MEMS PRESSURE SENSOR; and (2) pending prior U.S. Provisional Patent Application Ser. No. 60/534,089, filed Jan. 2, 2003 by Yakov Kogan for MICRO-ELECTRO-MECHANICAL VACUUM SENSOR.

The two above-identified patent applications are hereby incorporated herein by reference.

FIELD OF THE INVENTION

This invention relates to pressure sensors in general, and more particularly to micro-electro-mechanical pressure sensors.

BACKGROUND OF THE INVENTION

Gas pressure is a measure of the mechanical interaction of gas molecules with the surface of an object placed in that gas. Gas pressure is proportional to molecular concentration and gas temperature.

Methods for measuring gas pressure, based on characterizing a mechanical membrane deformation caused by the pressure differential on both sides of the membrane, are well known in the art. These methods can be used to measure both absolute and differential pressure. When the absolute pressure is of interest, one has to build a structure with a known pressure maintained on one side of the membrane, with the mechanical properties of the membrane being precisely designed for a given pressure range. This makes sensor construction complicated and susceptible to damage when the sensor is subjected to pressures outside the intended measurement range.

Vacuum measurement methods based on finding particle concentrations, such as the thermocouple gauge and the ion gauge methods, are also well known in the art. However, both the thermocouple gauge and the ion gauge methods suffer from disadvantages. The thermocouple gauge method is highly non-linear and has a limited dynamic range. The ion gauge method can generally only be used at high levels of vacuum and will generally be damaged if turned on at higher pressures. The ion gauge method also requires a high voltage electric source, which effectively prohibits its use in portable applications.

Also known is a method for measuring gas pressure by characterizing the damping effect of the gas on the motion of an oscillating structure excited by an external (i.e., other than by the gas itself) influence. However, sensors of this type have not seen widespread commercial application due to difficulties in building the mechanical structures and the electronic transducers necessary to achieve the required accuracy, dynamic range, response time and durability.

As a result, one object of the present invention is to provide an improved pressure sensor.

And another object of the present invention is to provide an improved method for measuring pressure.

SUMMARY OF THE INVENTION

These and other objects are addressed by the present invention which, in one form of the invention, comprises a pressure sensor having a mechanical portion and a transducer portion. The mechanical portion of the pressure sensor has a mass target (also sometimes referred to herein as a "proof mass") suspended on a spring structure, which together exhibit high Q (also sometimes referred to herein as "high quality") mechanical resonance. The moving part of the pressure sensor has a mass M and an area A, where the area A is presented in a plane perpendicular to the direction of the mechanical oscillation of the structure. As the spring structure moves, it will elastically deform. The sensor measures pressure by characterizing the effects that gas molecules produce on the motion of the structure. This effect may be the damping of an oscillating structure that is externally excited; or it may be the excitation effect caused by the impact of gas molecules on the structure.

More particularly, in one form of the invention, oscillation may be induced in the mass target, and the dampening effect of the gas molecules on the excited mass target may be observed: higher gas pressures will yield larger dampening effects.

And in another form of the invention, oscillation may be induced in the mass target and the additional excitation effect of the gas molecules impacting on the already excited mass target may be observed: higher gas pressures will yield larger additional excitation effects.

And in still another form of the invention, no external oscillation may be imputed to the mass target, and the excitation effect of the gas molecules impacting on the mass target may be observed: higher gas pressures will yield larger excitation effects.

In another form of the invention, there is provided a pressure sensor for measuring fluid pressure comprising a pressure sensing structure comprising a mass target suspended on a spring mechanism, wherein the mass target and the spring mechanism together exhibit high Q mechanical resonance, wherein the mass target has an area which is presented in a plane perpendicular to the direction of the mechanical oscillation of the structure, and further wherein the mass target and the spring mechanism are in the form of a membrane; and transducer means for measuring the fluid pressure by characterizing the effects that the fluid molecules produce on the motion of the structure.

In another form of the invention, there is provided a pressure sensor for measuring fluid pressure comprising a pressure sensing structure comprising a mass target suspended on a spring mechanism, wherein the mass target and the spring mechanism together exhibit high Q mechanical resonance, wherein the mass target has an area which is presented in a plane perpendicular to the direction of the mechanical oscillation of the structure, and further wherein the mass target is in the form of a membrane and at least a portion of the spring mechanism is in the form of spring arms; and transducer means for measuring the fluid pressure by characterizing the effects that the fluid molecules produce on the motion of the structure.

In another form of the invention, there is provided a pressure sensor for measuring fluid pressure comprising a pressure sensing structure comprising a mass target suspended on a spring mechanism, wherein the mass target and the spring mechanism together exhibit high Q mechanical resonance, wherein the mass target has an area which is presented in a plane perpendicular to the direction of the mechanical oscillation of the structure, and further wherein at least one of the mass target and the spring mechanism comprises a first electrode, with a second electrode being spaced from and stationary relative to the first electrode; first transducer means for applying a voltage across said first and second electrodes so as to induce oscillation of the mass target; and second transducer means for measuring the fluid pressure by characterizing the effects that the fluid molecules produce on the motion of the structure by converting the capacitance across the first and second electrodes into frequency by including it in a tank circuit of an electronic oscillator.

In another form of the invention, there is provided a pressure sensor for measuring fluid pressure comprising a pressure sensing structure comprising a mass target suspended on a spring mechanism, wherein the mass target and the spring mechanism together exhibit high Q mechanical resonance, wherein the mass target has an area which is presented in a plane perpendicular to the direction of the mechanical oscillation of the structure, wherein at least one of the mass target and the spring mechanism comprises a first electrode, with a second electrode being spaced from and stationary relative to the first electrode, and further wherein at least one of the mass target and the spring mechanism comprises a first mirror, with a second mirror being spaced from and stationary relative to the first mirror; first transducer means for applying a voltage across said first and second electrodes so as to induce oscillation of the mass target; and second transducer means for measuring the fluid pressure by characterizing the effects that the fluid molecules produce on the motion of the structure by optically measuring the distance between the first and second mirrors.

In another form of the invention, there is provided a pressure sensor for measuring fluid pressure comprising a pressure sensing structure comprising a mass target suspended on a spring mechanism, wherein the mass target and the spring mechanism together exhibit high Q mechanical resonance, wherein the mass target has an area which is presented in a plane perpendicular to the direction of the mechanical oscillation of the structure, and further wherein at least one of the mass target and the spring mechanism comprises a first electrode, with a second electrode being spaced from and stationary relative to the first electrode; first transducer means for applying a voltage across said first and second electrodes so as to induce oscillation of the mass target; second transducer means for tuning the frequency of the voltage applied across the first and second electrodes so as to be substantially twice the mechanical resonance frequency of the structure; and third transducer means for measuring the fluid pressure by characterizing the effects that the fluid molecules produce on the motion of the structure by converting the capacitance across the first and second electrodes into frequency by including it in a tank circuit of an electronic oscillator.

In another form of the invention, there is provided a pressure sensor for measuring fluid pressure comprising a pressure sensing structure comprising a mass target suspended on a spring mechanism, wherein the mass target and the spring mechanism together exhibit high Q mechanical resonance, wherein the mass target has an area which is presented in a plane perpendicular to the direction of the mechanical oscillation of the structure, wherein at least one of the mass target and the spring mechanism comprises a first electrode, with a second electrode being spaced from and stationary relative to the first electrode, and further wherein at least one of the mass target and the spring mechanism comprises a first mirror, with a second mirror being spaced from and stationary relative to the first mirror; first transducer means for applying a voltage across said first and second electrodes so as to induce oscillation of the mass target; and second transducer means for measuring the fluid pressure by characterizing the additional motion that the fluid molecules induce in the structure by optically measuring the distance between the first and second mirrors.

In another form of the invention, there is provided a pressure sensor for measuring fluid pressure comprising a pressure sensing structure comprising a mass target suspended on a spring mechanism, wherein the mass target and the spring mechanism together exhibit high Q mechanical resonance, wherein the mass target has an area which is presented in a plane perpendicular to the direction of the mechanical oscillation of the structure, and further wherein at least one of the mass target and the spring mechanism comprises a first mirror, with a second mirror being spaced from and stationary relative to the first mirror; and transducer means for measuring the fluid pressure by characterizing the motion that the fluid molecules induce in the structure by optically measuring the distance between the first and second mirrors.

In another form of the invention, there is provided a method for measuring fluid pressure comprising positioning a pressure sensing structure in the fluid, wherein the pressure sensing structure comprises a mass target suspended on a spring mechanism, wherein the mass target and the spring mechanism together exhibit high Q mechanical resonance, wherein the mass target has an area which is presented in a plane perpendicular to the direction of the mechanical oscillation of the structure, and further wherein the mass target and the spring mechanism are in the form of a membrane; inducing oscillation in the structure; and measuring the fluid pressure by characterizing the effects that the fluid molecules produce on the motion of the structure.

In another form of the invention, there is provided a method for measuring fluid pressure comprising positioning a pressure sensing structure in the fluid, wherein the pressure sensing structure comprises a mass target suspended on a spring mechanism, wherein the mass target and the spring mechanism together exhibit high Q mechanical resonance, wherein the mass target has an area which is presented in a plane perpendicular to the direction of the mechanical oscillation of the structure, and further wherein at least one of the mass target and the spring mechanism comprises a first mirror, with a second mirror being spaced from and stationary relative to the first mirror; and measuring the fluid pressure by characterizing the motion that the fluid molecules induce in the structure by optically measuring the distance between the first and second mirrors.

BRIEF DESCRIPTION OF THE DRAWINGS

These and other objects and features of the present invention will be more fully disclosed or rendered obvious by the following detailed description of the preferred embodiments of the invention, which is to be considered together with the accompanying drawings wherein like numbers refer to like parts and further wherein.

DETAILED DESCRIPTION OF THE PREFERRED EMBODIMENTS

Theory of Operation

The mechanical portion of the pressure sensor has a mass target (also sometimes referred to herein as a "proof mass") suspended on a spring structure, which together exhibit high Q (also sometimes referred to herein as "high quality") mechanical resonance. The moving part of the pressure sensor has a mass M and an area A, where the area A is presented in a plane perpendicular to the direction of the mechanical oscillation of the structure. As the spring structure moves, it will elastically deform. The sensor measures pressure by characterizing the effects that gas molecules produce on the motion of the structure. This effect may be the damping of an oscillating structure that is externally excited; or it may be the excitation effect caused by the impact of gas molecules on the structure.

The pressure sensor may take the form of many different embodiments.

Figure 1:
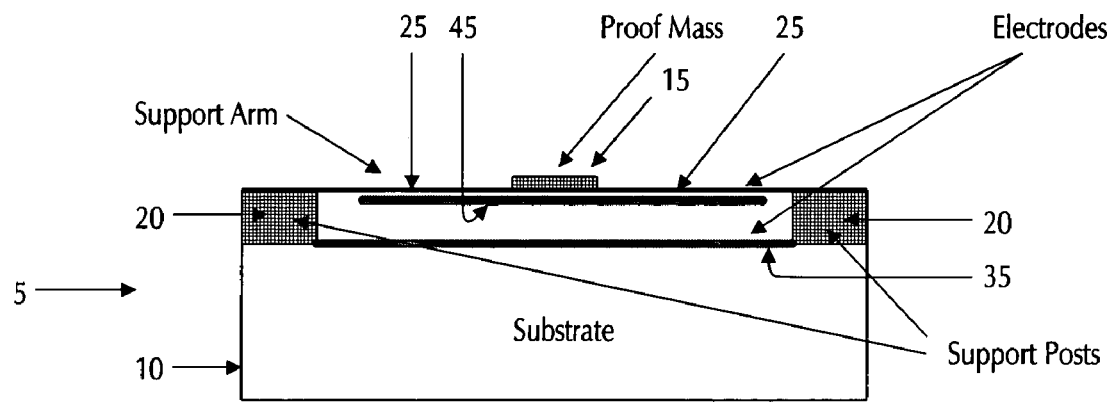
FIGS. 1 and 2 are schematic side and top views, respectively, of a pressure transducer formed in accordance with the present invention.
Figure 2:
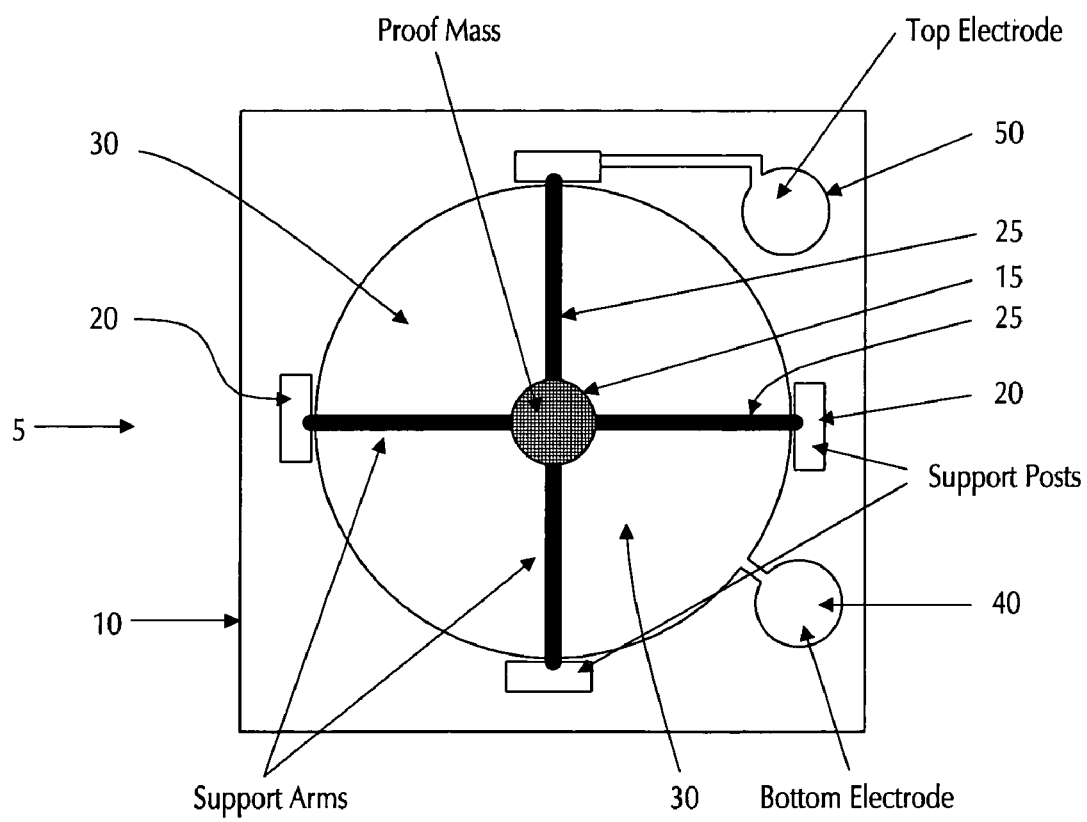

By way of example but not limitation, and looking now at FIGS. 1 and 2, there is shown a pressure sensing MEM structure 5 which comprises a substrate 10 and a proof mass 15 supported over substrate 10 by support posts 20 and support arms 25 (separated by gaps 30) such that proof mass 15 is essentially supported on a spring structure over substrate 10. Gas is able to act on both sides of proof mass 15 due to the presence of gaps 30 between support arms 25. A bottom electrode 35 (accessed by a bottom electrode pad 40) is mounted on substrate 10, and a top electrode 45 (accessed by a top electrode pad 50) is attached to support arms 25. As a result of this construction, when an appropriate voltage is applied across bottom electrode 35 and top electrode 45, proof mass 15 can be moved relative to substrate 10. Furthermore, the two separated electrodes 35 and 45 form a capacitor, with the capacitance changing as the distance between the electrodes 35 and 45 changes. Such a structure, and methods for making the same, are described in U.S. Pat. No. 6,438,149, issued Aug. 20, 2002 to Tayebati et al. for MICROELECTROMECHANICALLY TUNABLE, CONFOCAL, VERTICAL CAVITY SURFACE EMITTING LASER AND FABRY-PEROT FILTER Ser. No. 09/105,399, which patent is hereby incorporated herein by reference.

Figure 3:
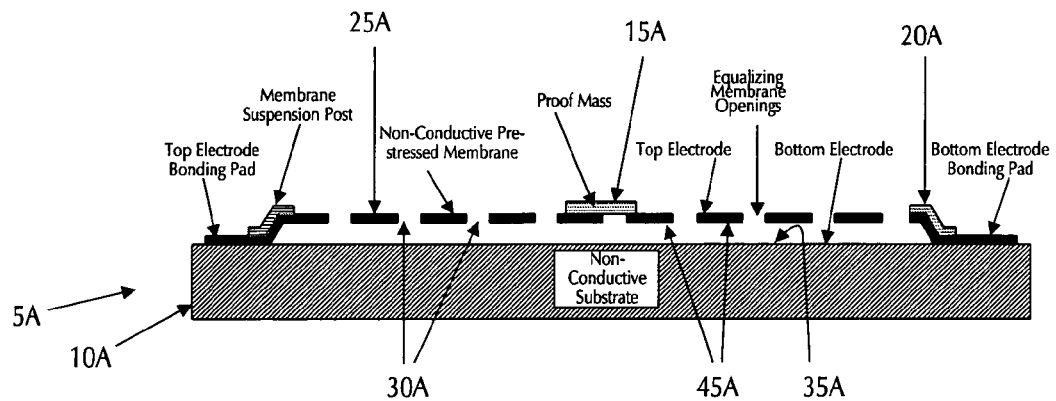
FIGS. 3 and 4 are schematic side and top views, respectively, of another pressure transducer formed in accordance with the present invention.
Figure 4:
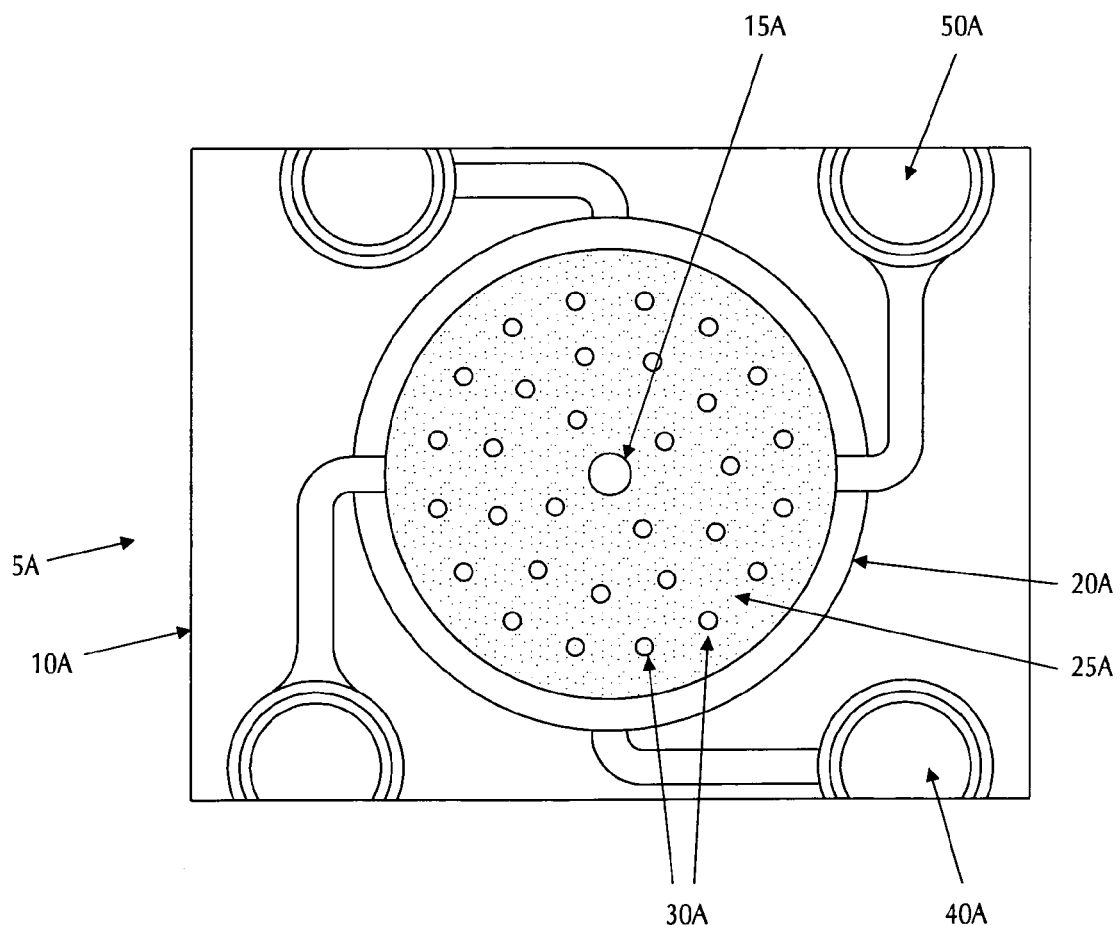

By way of further example but not limitation, and looking now at FIGS. 3 and 4, there is shown another pressure sensing MEM structure 5A which comprises a substrate 10A and a proof mass 15A supported over substrate 10A by membrane suspension post(s) or rim 20A and a dome 25A (having openings 30A therein) such that proof mass 15A is essentially supported on a spring structure over substrate 10A. Gas is able to act on both sides of proof mass 15A due to the presence of openings 30A in dome 25A. A bottom electrode 35A (accessed by a bottom electrode pad 40A) is mounted on substrate 10A, and a top electrode 45A (accessed by a top electrode pad 50A) is attached to dome 25A. As a result of this construction, when an appropriate voltage is applied across bottom electrode 35A and top electrode 45A, proof mass 15A can be moved relative to substrate 10A. Furthermore, the two separated electrodes 35A and 45A form a capacitor, with the capacitance changing as the distance between the electrodes 35A and 45A changes. Such a structure, and methods for making the same, are described in (i) U.S. Pat. No. 6,438,149, issued Aug. 20, 2002 to Tayebati et al. for MICROELECTROMECHANICALLY TUNABLE, CONFOCAL, VERTICAL CAVITY SURFACE EMITTING LASER AND FABRY-PEROT FILTER Ser. No. 09/105,399, which patent is hereby incorporated herein by reference, and (ii) U.S. Pat. No. 6,584,126, issued Jun. 24, 2003 to Wang et al. for TUNABLE FABRY-PEROT FILTER AND TUNABLE VERTICAL CAVITY SURFACE EMITTING LASER Ser. No. 09/750,434, which patent is also hereby incorporated herein by reference.

Still other embodiments for the pressure sensor will be apparent to those skilled in the art in view of the present disclosure.

For convenience of description, the invention will hereinafter sometimes be discussed in the context of the embodiment of FIGS. 3 and 4; however, this is intended to be by way of illustration only and not by way of limitation.

The spring suspension of the proof mass is preferably constructed as a membrane (e.g., such as the dome 25A shown in FIGS. 3 and 4) having a surface area large enough to serve as a sensing element for interacting with the gas, whereby to serve a dual purpose (i.e., as both proof mass and spring) and thereby simplify the design. No additional structure is required to enhance damping. The membrane itself is exposed to the influence of gas on both sides because it has openings 30A therein (which may be the same openings used to etch away a sacrificial layer beneath the membrane, e.g., such as disclosed in the aforementioned U.S. Pat. Nos. 6,438,149 and 6,584,126). The membrane deposition process is preferably designed such that it leaves residual stress in the membrane so that, once the sacrificial layer is etched away from beneath the membrane, the membrane is stretched over the gap.

It is also important to note that the semiconductor deposition process preferably used to create the membrane (i.e., the dome 25A) allows fabricating a membrane which is extremely thin (e.g., on the order of approximately 1 micron). This minimizes the mass of the moving part, thereby increasing the resonance frequency of the structure and reducing the response time of the pressure sensor. Furthermore, the fact that the membrane is pre-stressed increases the spring constant, thus further increasing the resonance frequency of the structure and its sensitivity to the damping influence of gas.

Electrically, this MEM structure is an "air gap" capacitor. The top electrode 45A is deposited on the flexible, pre-stressed dome-shaped membrane 25A serving as a suspension for a proof mass. The bottom electrode 35A is deposited on the MEM isolating substrate 10A. When electric voltage is applied between the bottom electrode 35A and top electrode 45A, electrostatic attraction causes the membrane 25A to move towards the substrate 10A.

An important aspect of the present invention is the creation of a high Q mechanical resonance structure that will convert the influence of gas molecules into mechanical deflection of the membrane and to create a high Q electrical or optical resonator to detect this mechanical deflection with very high resolution.

In the case of an optical resonator, to create an optical Fabry-Perot cavity, high reflectivity optical mirrors can be deposited on the substrate 10A and on the membrane 25A, e.g., such as is disclosed in the aforementioned U.S. Pat. Nos. 6,438,149 and 6,584,126. In this respect it should be appreciated that an optical cavity can be built with a much higher Q than an electrical oscillator, thus yielding much higher membrane displacement resolution. By way of example but not limitation, using an optical cavity, 1 picometer resolution of membrane displacement has been achieved.

In one preferred method for determining gas pressure from the mechanical deflection of the membrane, the structure (e.g., dome 25A) is excited by electrostatic forces created by applying voltage between the bottom electrode 35A and the top electrode 45A at a frequency close to the mechanical resonance frequency of the MEM. In order to achieve this effect, as it is evident from Equation (2) below, the frequency of excitation should be twice the resonance frequency of the structure. Significant innovations include the following, among others:

(1) The pressure transducer uses an improved MEM construction.

(2) The same electrodes that are used for MEM excitation are also used to create a high Q RF oscillator. The FM modulation of this oscillator represents the membrane motion. This allows for the most efficient MEM area utilization because it does not require separate capacitors for excitation and sensing. The membrane displacement signal (obtained by FM demodulation) is then synchronously detected with an electrostatic excitation signal to obtain the amplitude of membrane displacement. Synchronous detection further increases the membrane displacement resolution and thus the accuracy of gas pressure measurement.

(3) The frequency of the excitation voltage is constantly tuned by an automatic control loop to achieve the highest possible membrane motion amplitude for a given voltage value, thus tracking any drifting of the mechanical resonance frequency of the MEM. This is a very important feature because it allows the use of a very high Q mechanical resonator, thereby improving the system's gas sensitivity without creating a measurement error caused by even insignificant (e.g., several Herz) mechanical resonance detuning from the electrical excitation. The system then works in self-compensating mode by maintaining the amplitude of the mechanical resonant oscillation constant for different levels of gas pressure. The amplitude of excitation voltage is a function of gas pressure.

(4) The displacement amplitude set point does not need to remain constant over the entire measurement range. High displacement amplitude measurement resolution allows the amplitude set point to be reduced at higher pressure, thus reducing the voltage required to achieve it. This extends the dynamic range of the gas measurement to lower vacuum levels while still achieving high accuracy.

(5) To increase the accuracy of the method, especially at high levels of vacuum when the excitation voltage is low, a programmable attenuator circuit (sometimes referred to herein as a programmable gain circuit or amplifier) can be used. This allows scaling some components of the drive voltage electrical noise with the signal amplitude, thus keeping the same accuracy over a wider dynamic range.

The following is the differential equation describing MEM membrane motion:

$$M \cdot \frac{d^2}{dt^2}x(t) + c \cdot \frac{d}{dt}x(t) + K \cdot A \cdot x(t) = F(t) \quad (1)$$

where:

M is the combined effective mass of the moving MEM structure;

x(t) is structure displacement;

c is the damping coefficient dominated by the damping effect caused by gas molecules;

A is membrane area;

K is the MEM membrane spring constant normalized to membrane area; and

F(t) is the external electrostatic force.

Figure 5:
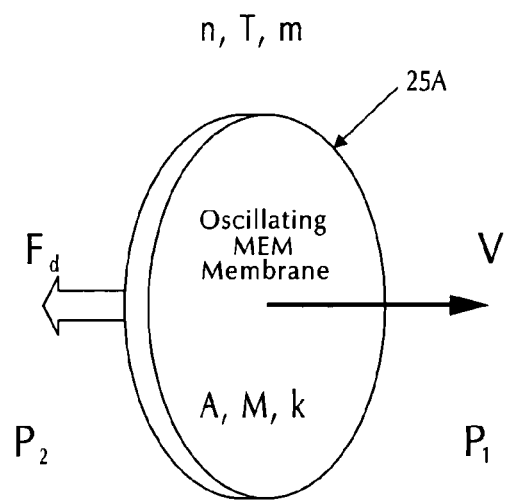
FIG. 5 is a schematic model of an oscillating MEM membrane.

Considering the approximated model shown on FIG. 5, the following correlations are derived in Equations (2) and (3) below:

$$F(t) := \frac{\varepsilon_0 \cdot A \cdot Vm^2 \cdot (\sin(2 \cdot \pi \cdot f \cdot t))^2}{(D - x(t))^2} \quad (2)$$

where:

Vm sin(2·π·f·t) is the sinusoidal voltage with frequency f and amplitude Vm applied to the MEM capacitor;

$\varepsilon_0$ is the dielectric strength of vacuum; and

D is the distance between the top and bottom electrodes.

And $$c := \frac{13}{3} \cdot A \cdot m \cdot vt \cdot n \quad (3)$$

where:

m is the average gas molecule mass;

vt is the average velocity of gas molecule thermal motion; and n is gas molecule concentration.

Solving differential Equation (1), taking into account Equation (2) and Equation (3), establishes the correlation between gas concentration, average gas molecule mass and the velocity of thermal motion with the maximum membrane displacement caused by sinusoidal drive voltage, when the frequency of this voltage is such that it causes the MEM structure 5A to resonate.

The proposed MEM pressure sensor transducer design is based on a compensation feedback architecture that maintains preset MEM membrane displacement by changing electric drive voltage amplitude, while keeping the MEM in resonance condition by changing electric drive voltage frequency. Voltage amplitude in this transducer is a function of gas molecule concentration, average molecular mass and the temperature of the gas. Changing drive voltage frequency to maintain the resonance condition is very important, because the mechanical properties of the MEM structure change due to environmental changes (e.g., temperature, pressure, etc.) and contamination which may occur during use (e.g., such as during use in a vacuum deposition chamber, etc.). It should also be noted that the membrane displacement setpoint will change as the transducer switches from one measurement range to the next, whereby to extend the transducer dynamic range and minimize physical effects other than gas friction damping (such as squeeze damping and sonic waves at high pressure).

The advantages of this architecture become clear when the following approximate correlation is considered:

$$Xm := \Phi \cdot \frac{(Vm)^2}{P} \quad (4)$$

where:

Xm is membrane resonance motion amplitude;

Vm is drive voltage amplitude;

Φ is coefficient; and

P gas pressure.

From Equation (4) it will be seen that the dynamic range of pressure measurement will be the square of the effective dynamic range of the drive voltage amplitude change. This potentially allows 9.6 decades of dynamic range with a 16 bit drive voltage resolution. The function becomes non-linear when pressure is above 0.5 Torr and the molecules free run distance becomes comparable to the membrane diameter. It is currently believed that this is caused by the sonic waves created by the sensor motion and it was observed in an oscillator RF spectrum. This phenomenon reduces the maximum measured pressure to 10 Torr. On the low end of the dynamic range, it is believed that the dynamic range is limited by excitation voltage resolution and membrane displacement measurement resolution. Also, at the low end of the transducer dynamic range, the time it takes the MEM to reach full resonance amplitude becomes long. This increases the sensor response time and can make the transducer feedback loop unstable. In order to prevent this in real life vacuum applications, the transducer should be turned on when the vacuum level is still low.

Transducer Design

Figure 6:
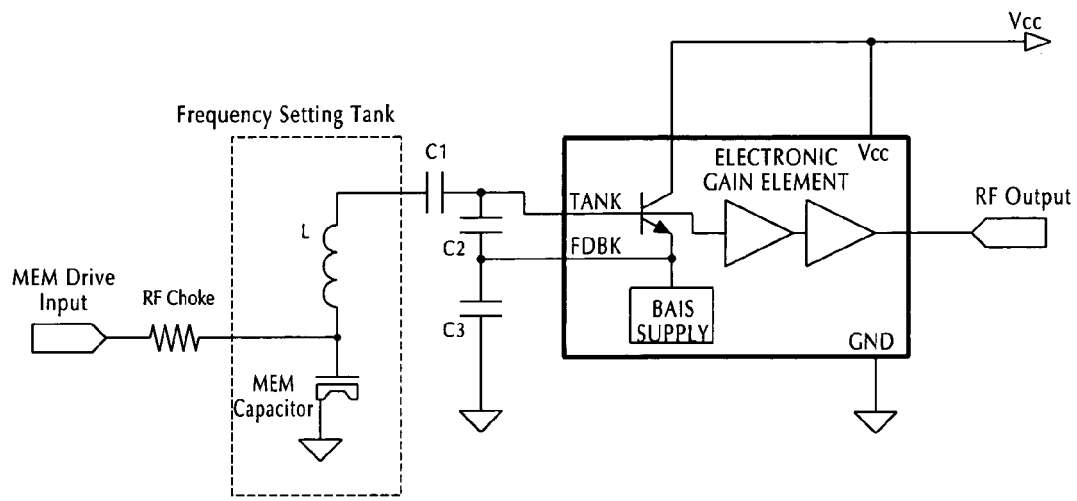
FIG. 6 is a capacitance-to-frequency converter which may be incorporated in the pressure transducer.
Figure 7:
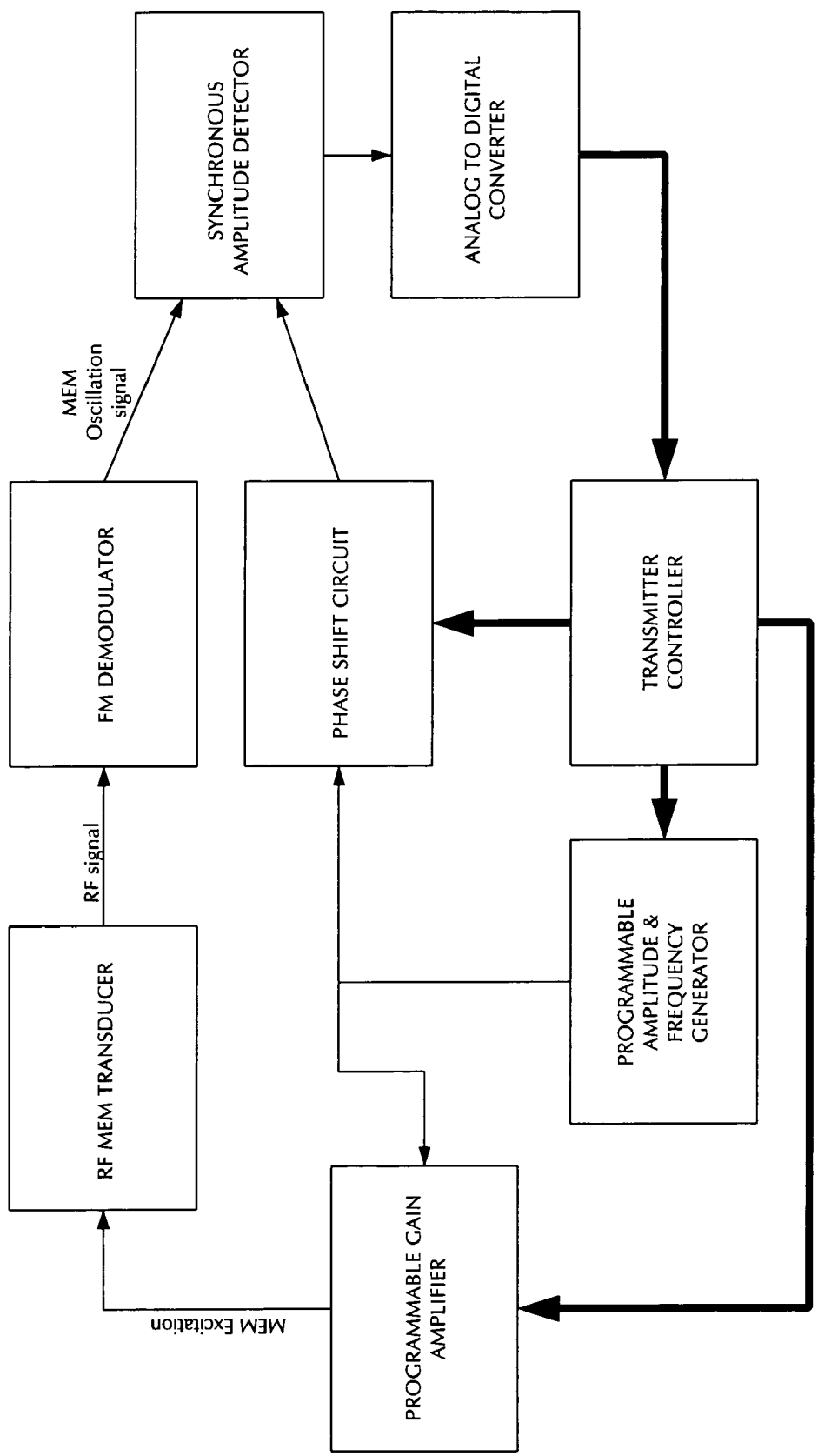
FIG. 7 is a functional block diagram of one preferred form of pressure transducer.
Figure 8:
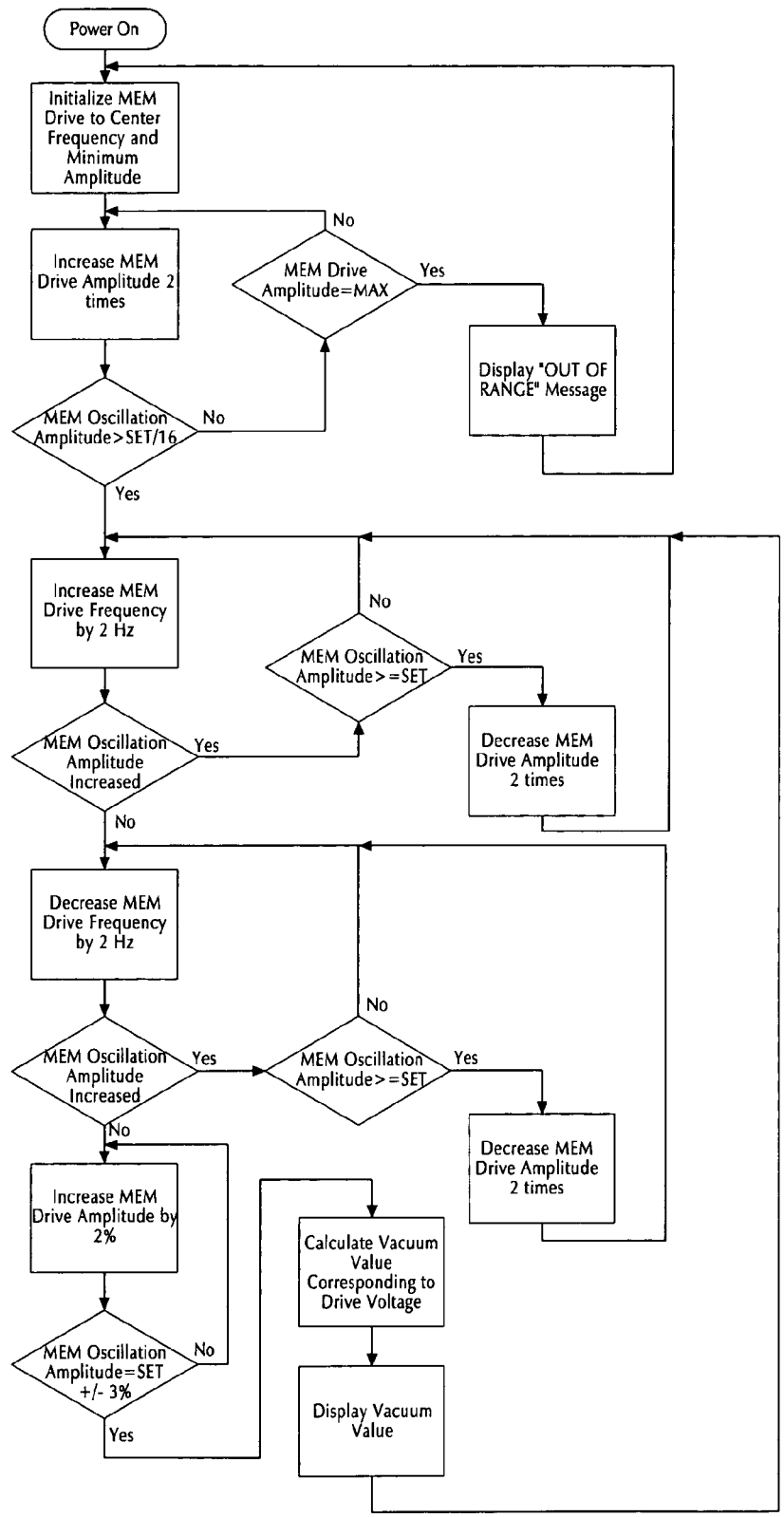
FIG. 8 shows the preferred algorithm preformed by pressure transducer.

To increase MEM fabrication throughput and to ensure the high mechanical resonance frequency of the MEM structure, it is desirable to keep the MEM structure small. The motion of the MEM membrane in the proposed design is measured by the change in the structure capacitance. However, the capacitance value is proportional to the sensor area. So there are contradicting design requirements that are solved by introducing the MEM capacitance-to-frequency converter shown in FIG. 6. More particularly, the MEM structure is connected into a frequency setting tank circuit of a RF oscillator. The output RF signal of the oscillator is phase modulated by the MEM membrane motion. As shown in FIG. 7, an FM Demodulator demodulates the RF signal. Essential for the FM Demodulator design is self-tuning to the recovered RF carrier frequency, which reduces the requirements for MEM capacitor stability. A Synchronous Amplitude Detector generates a signal proportional to the MEM mechanical oscillation amplitude. Phase modulation, along with subsequent synchronous detection, ensures a high signal-to-noise ratio by moving the signal to the high frequency domain and making the effective circuit passband very narrow, thus filtering out both electrical and mechanical noise. The signal representing the MEM mechanical oscillation amplitude is fed into the Transmitter Controller via an Analog-to-Digital Converter. The Transmitter Controller executes the algorithm shown in FIG. 8 and calculates the vacuum value from the value of the drive voltage amplitude required to maintain a set mechanical motion amplitude. A Programmable Gain Amplifier is included in the architecture to increase the MEM drive voltage dynamic range and thus increase the dynamic range of the vacuum measurement. The Programmable Phase Shift Circuit works in tandem with the Synchronous Amplitude Detector. The adaptive nature of the transmitter design and algorithm compensates for any changes in the MEM structure due to changes in environmental temperature and ensures MEM longevity by preventing MEM mechanical motion runaway.

Various improvements can be implemented to the basic MEM structure and electronic transducer design to meet the needs of a particular industry.

For example, one concern with capacitance manometers is the change in membrane thickness due to a gradual build-up from the deposition processes that are performed in the chamber. This remains a concern for the MEM oscillating sensor, too, because it changes the mass and stiffness of the oscillating membrane. Many deposition methods are based on emission of charged particles. To prevent the deposition of these particles on the MEM membrane, a third electrode (not shown) can be created on the top of the membrane 25A and an appropriate constant electric potential can be applied to this third electrode to repel charged particles from the membrane. This technique can also be used if it is necessary to measure the concentration of positive and negative ions separately.

By way of further example, two different MEM structures, each optimized for its own pressure range and each connected to its own RF oscillator can be combined with the rest of electronics to increase the measurement accuracy and the overall dynamic range of the pressure sensor.

Additional Embodiments

Another measurement method may be used to determine gas pressure from mechanical deflection of the membrane. In this alternative measurement method, oscillation may be induced in the mass target, and the additional excitation effect of the gas molecules impacting on the already excited mass target may be observed: higher gas pressures will yield larger additional excitation effects.

Still another measurement method may be used to determine gas pressure from mechanical deflection of the membrane. This alternative measurement method is substantially passive: the MEM structure is not excited by voltage but rather reacts to gas molecule collisions. This method works especially well with optical (e.g., Fabry-Perot cavity) membrane displacement measurement methods because of the much higher membrane displacement sensitivity which can be achieved with optical displacement detectors.

The following is a description of this alternative measurement method.

The electrostatic MEM structure 5A described above is modified to include a high reflectivity optical mirror (not shown) incorporated into the structure of the membrane 25A, and a second mirror (not shown) is deposited on top of the substrate electrode. See, for example, the aforementioned U.S. Pat. Nos. 6,438,149 and 6,584,126, which show such mirrors incorporated into the MEM structure. Thus, an electrically tunable Fabry-Perot cavity is constructed. A laser source (not shown) is selected such that its wavelength falls within the 3 dB transmission region of the formed Fabry-Perot cavity. Both the laser wavelength and the Fabry-Perot cavity wavelength are either stable or electronically locked to a set wavelength. As gas molecules collide with the MEM membrane, the superposition of these collisions will cause membrane oscillation. If the relaxation time of this oscillation is significantly higher than the frequency of molecule collision superposition events that are strong enough to change the membrane motion, the amplitude of oscillation will remain substantially constant. However, the phase of oscillation will change with every new collision event. The intensity of laser light transmitted through the MEM cavity will then be modulated by this membrane motion. Phase, amplitude and the derivative of intensity change are functions of gas concentration, average molecular mass and temperature.

What is claimed is:

1. A pressure sensor for measuring fluid pressure comprising:

a pressure sensing structure comprising a mass target suspended on a spring mechanism, wherein the mass target and the spring mechanism together exhibit high Q mechanical resonance, wherein the mass target has an area which is presented in a plane perpendicular to the direction of the mechanical oscillation of the structure, and further wherein at least one of the mass target and the spring mechanism comprises a first electrode, with a second electrode being spaced from and stationary relative to the first electrode;

first transducer means for applying a voltage across said first and second electrodes so as to induce oscillation of the mass target;

second transducer means for tuning the frequency of the voltage applied across the first and second electrodes so as to be substantially twice the mechanical resonance frequency of the structure; and third transducer means for measuring the fluid pressure by characterizing the effects that the fluid molecules produce on the motion of the structure by converting the capacitance across the first and second electrodes into frequency by including it in a tank circuit of an electronic oscillator.

* * * * *

UNITED STATES PATENT AND TRADEMARK OFFICE
CERTIFICATE OF CORRECTION

PATENT NO. : 7,047,810 B2  Page 1 of 1
APPLICATION NO. : 10/758354
DATED : May 23, 2006
INVENTOR(S) : Yakov Kogan, Daryoosh Vakhshoori and Peidong Wang It is certified that error appears in the above-identified patent and that said Letters Patent is hereby corrected as shown below:

Column 1, Line 16, please insert:

--STATEMENT REGARDING FEDERALLY SPONSORED RESEARCH

This invention was made with Government support under Contract Number DMI-0319845 awarded by the National Science Foundation (NSF). The Government has certain rights in the invention.--

Signed and Sealed this

Twenty-fifth Day of November, 2008

JON W. DUDAS
*Director of the United States Patent and Trademark Office*